March 18, 1969  J. C. SCHNEIDER  3,433,540
FLUID-TIGHT SHAFT SEAL ASSEMBLY
Filed Sept. 9, 1966  Sheet 1 of 5

INVENTOR.
JOHN C. SCHNEIDER
BY~ Maybee & Legris
ATTORNEYS

United States Patent Office 3,433,540
Patented Mar. 18, 1969

3,433,540
FLUID-TIGHT SHAFT SEAL ASSEMBLY
John C. Schneider, 177 Balmoral Drive,
Brampton, Ontario, Canada
Filed Sept. 9, 1966, Ser. No. 578,221
Claims priority, application Canada, Nov. 27, 1965,
946,419
U.S. Cl. 308—36.1                    5 Claims
Int. Cl. F16j *15/50, 15/54;* F16c *35/04*

ABSTRACT OF THE DISCLOSURE

A seal and support assembly for a unitary rotatable shaft projecting into a container for fluids having a first sealing means encircling the shaft to prevent fluid leakage during operation of the shaft and a second sealing means encircling the shaft out of sealing engagement during operation of the shaft but movable to sealing engagement when the shaft is not in operation. The assembly has a bearing retaining spool for the shaft which is removable together with the bearings, as is the first sealing means, without container drainage or disassemblage or removal of the shaft supporting assembly.

---

The present invention relates to a seal assembly for rotatable shafts and more particularly to a replaceable bearing and seal assembly for a rotatable shaft projecting through wall of a fluid container.

In procedures involving the use of rotary driven devices for the mixing, agitating, dispersing, repulping or low head pumping of fluids or solid-fluid mixtures, shafts of these rotary devices in many cases must enter through a hole in the side of the particular fluid containing vessel and precautions must be taken to insure that a proper seal is provided around the shaft to prevent runout of fluid therealong. Originally, standard sealing devices were provided for these rotatable shafts which prevented escape of fluid from the container and which were adequate for the purpose as long as the bearing assembly and seal for the shaft were in proper working order. Upon development of some fault in the bearing assembly and/or seal, however, drainage of the fluid container and complete removal of the shaft bearing and support mechanism from the wall of the container was necessary. This procedure involved, of course, serious and costly delays and inconveniences.

In order to avoid these delays and inconveniences involving container drainage and mechanism removal a number of arrangements of shaft seal assemblies have been evolved by which auxiliary sealing means are utilized in addition to a primary sealing means whereby, upon breakdown of the primary sealing means, the auxiliary sealing means is engaged allowing removal of the primary sealing means for repair without drainage of the fluid container. These arrangements have consisted of multiple section shafts which provide for removal of a seal after separation of shaft sections or provision of a sleeve on the shaft which may be removed followed by removal of the mechanical seal. With the former arrangement there is a relatively long distance between seal and support bearings with resulting excessive stresses and wear on the mechanical seal. With neither arrangement can the support bearings be properly serviced or replaced without complete disconnection of the shaft drive assembly. Thus, these arrangements have provided for only the removal of a mechanical seal for repair or repacking of a stuffing box without drainage of the fluid container and repair of the bearing assemblies for the rotatable shaft involves considerable more delay and inconvenience.

It has now been discovered that a shaft seal and support assembly can be provided for a unitary rotatable shaft projecting through a wall in a fluid container which allows the removal and repair or replacement of both the sealing means and the shaft bearings without the need of fluid container drainage and without disassemblage and/or removal of the shaft support and bearing assembly.

It is an object of the present invention to provide a rotatable shaft seal and support assembly which allows the rapid change of a non-split seal assembly, such as a mechanical seal, or replacement of packing in a packed stuffing box without drainage of fluid being worked upon.

It is a further object of the present invention to provide a novel shaft support assembly combined with a fluid-tight shaft seal assembly which allows the rapid servicing and/or replacement of bearings and seals without attendant tearing down of the support assembly and which reduces stress and wear on fluid seals to a minimum.

Other objects and advantages of the invention will become apparent from the following description taken in conjunction with the accompanying drawing in which.

Generally speaking, the present invention relates to a shaft seal and support assembly for a unitary rotatable shaft projecting through an opening in a container for fluids and having an end supported outside the container. The assembly comprises a sealing means, for preventing fluid leakage from the container along the shaft, which encircles the shaft and is located near the container opening. A drive connecting means, such as a sheave, is connected to the outside end of the shaft and is adapted to be driven by a drive means. An assembly body surrounds the shaft between the drive connecting means and the sealing means and a bearing retaining spool containing front and rear support bearings for the shaft, which are retained and fitted inside the spool, is slidably tightly located inside the assembly body. The bearing spool is removably attached to the assembly body at the outside end of the shaft and the inner sleeve of the bearings has a tight friction fit around the shaft. There is a shaft retaining means on the outside end of the shaft and a spool removal means associated with the spool and the assembly body which is adapted to loosen the spool from around the shaft upon removal of the drive connecting means and the shaft retaining means. Use of the spool removal means then allows removal of the bearing retaining spool complete with bearings from the assembly body and from the outside end of the unitary shaft. After removal of the bearing retaining means removal of an unsplit seal assembly, such as a mechanical seal, or repacking of a packed stuffing box can be carried out. Advantageously, a second sealing means encircles the shaft between the first-mentioned sealing means and the container opening which is out of sealing engagment during operation of the shaft but which is adapted to be put into sealing engagment when the shaft is not in operation to prevent leakage of fluid around the shaft and allow removal of support bearings and non-split seal assembly or repacking of a stuffing box without drainage of fluid from the container.

Figure 1:
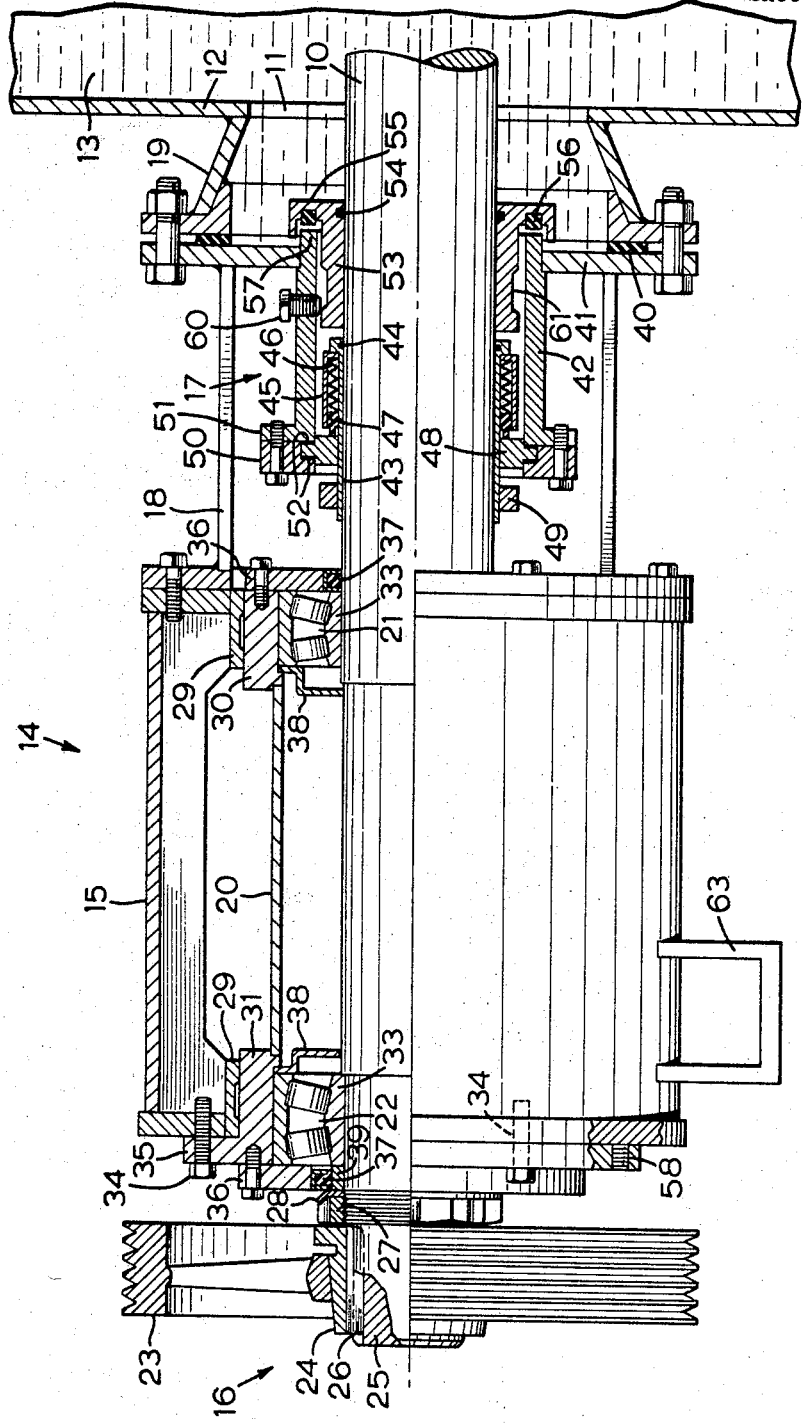
FIG. 1 is a side elevational view, partly broken away and partly in section, of a shaft support and seal assembly arrangement embodying the present invention.

Referring now to the drawings, in which like parts are indicated by like reference numerals, and in particular to FIG. 1 which shows an elevational view of an embodiment of the present invention, partially broken away and partially in section, a rotatable shaft 10 is shown projecting through an opening 11 in a wall 12 of a container for a fluid 13 with the shaft 10 being supported by a support structure assembly identified generally by reference numeral 14. The support structure assembly 14 comprises an assembly body 15, which surrounds the shaft 10 between a drive connecting means 16 and a first fluid sealing means 17, an open ribbed flange assembly 18 integrally connecting the assembly body 15 to the container wall 12 by way of an adaptor flange 19 surrounding the opening 11 in the container and a shaft bearing retaining spool 20 containing front and rear support bearings 21, 22 for the shaft 10, the spool 20 being slidably and tightly located inside the assembly body 15.

The drive connecting means 16 can be a sheave 23, as shown, which is belt driven by a drive means (not shown) attached to a pulley on an electric motor. Collet 24 of the sheave 23 is advantageously attached to outside end 25 of the shaft 10 by way of key 26. Rotation of the shaft at a speed reduced from that of the motor is attained by proper size arrangement of the sheave 23 and the pulley on the motor. A reducing gear arrangement on the motor shaft and the shaft 10 can also be utilized for rotating the shaft 10. A shaft retaining means such as mounting nut 27 over lockwasher 28 is used for holding the shaft 10 in position.

The assembly body 15 has inner sleeve portions 29 integral therewith and the sleeves 29 receive the bearing retaining spool 20 with a close sliding fit by way of cylindrical end portions 30, 31 on the spool 20. As aforementioned, the spool 20 contains the front and rear support bearings 21, 22 for the shaft 10 with outer bearing sleeves 32 being closely fitted inside the cylindrical end portions 30, 31 of the spool 20. Inner bearing sleeves 33 of the support bearings 21, 22 have a tight sliding fit on the shaft 10. The spool 20 is attached to and retained by the assembly body 15 at the rear bearing end thereof by removable attaching means such as machine bolts 34 running through flange 35 on the end portion 31 of the spool 20 and into the assembly body 15. The bearings 21, 22 are retained in position inside the spool 20 by means of bearing locking rings 36 which are bolted to the end portions 30, 31 on the spool 20. Grease seals 37 prevent grease from running along the shaft 10 and grease retainer rings 38 maintain a supply of grease for the bearings 20, 21. Grease is supplied to the bearings through grease lines (not shown). A bearing spacer 39 separates the inner bearing sleeve 33 of the rear support bearing 22 from the lockwasher 28 inside the shaft mounting nut 27.

The assembly body 15 is bolted to the flange assembly 18 which in turn is bolted to the adaptor flange on the wall 12 of the fluid container with a sealing gasket 40 therebetween. The flange assembly 18 has an annular plate 41 integrally attached thereto with a cylindrical stuffing box 42 being integrally attached in a fluid-tight manner to the annular plate 41. The stuffing box 42 extends away from the adaptor flange 19 and surrounds the shaft 10 in a spaced-apart relationship therewith. In the embodiment shown in FIG. 1 the stuffing box 42 contains a mechanical seal arrangement and together the stuffing box and mechanical seal arrangement make up the first fluid sealing means 17. The fluid sealing means 17 may be any type of unsplit seal assembly which will prevent fluid leakage along the shaft.

A mechanical seal arrangement can be any standard type well known in the art and, although a single seal is shown in FIG. 1, double-acting seals can be used if desired. A mechanical seal sleeve 43 is shown located on the shaft 10 in fluid-tight relationship therewith, with O ring 44 preventing leakage along the shaft 10. Mechanical seal 45 seated on the sleeve 43 contains a compressed spring 46 pressing against seal member 47, as well known in the art. The seal member 47 bears against mechanical seal seat 48. The sleeve 43 is held in position by a locking device, such as set-screw 49. Mechanical seal locking ring 50, bolted to flange 51 of the stuffing box 42, contains the mechanical seal seat 48 in fluid-tight relationship by way of gaskets 52.

A second, auxiliary sealing means 53 encircles the shaft 10 in fluid-tight relationship therewith, with O ring 54 preventing fluid leakage along the shaft. The sealing means 53 has a projecting collar portion 55 thereon with a shut-off annular sealing ring 56 set therein. In FIG. 1 the second sealing means is shown to be out of sealing engagement with the shaft 10 in operative position. As described hereinafter in conjunction with FIG. 2 (which identifies the same parts as shown in FIG. 1), the sealing means 53 is put into sealing engagement by bringing the sealing ring 56 into fluid-tight contact with projecting annular portion 57 of the stuffing box 42.

Figure 2:
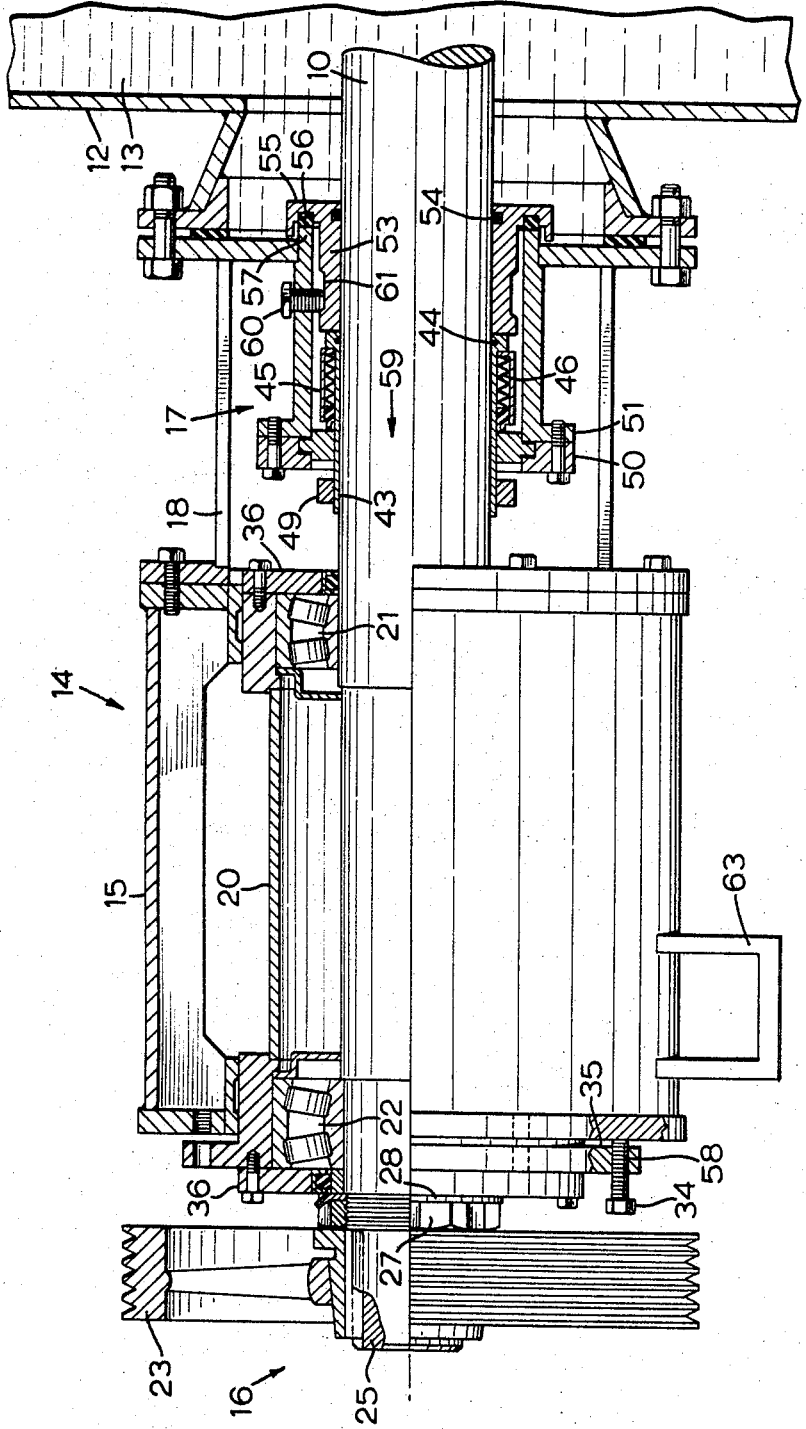
FIG. 2 is a side elevational view of the assembly shown in FIG. 1, again partly broken away and partly in section, with auxiliary sealing means brought into engagement.

In the event that the mechanical seal 45 has to be serviced or replaced, or if repair work is necessary on either or both of the front and rear support bearings 21, 22, the second sealing means 53 is put in sealing engagement and the bearing retaining spool 20, complete with bearings, is removed, as is the mechanical seal 45, if necessary. The procedure followed in such an event is best described in conjunction with both FIG. 1 and FIG. 2 of the drawings. Referring to these figures, the spool retaining bolts 34 are removed from the spool 20 and the assembly body 15. The drive connections and the driven sheave 23 may be first removed, if desired, although the sheave 23 is shown still connected in FIG. 2. The bolts 34 are seen to be removed in FIG. 2. The sleeve 43 holding the mechanical seal 45 is loosened by loosening the locking device 49. At least two of the retaining bolts are then inserted in tapped holes 58 (only one of these holes is shown in FIGS. 1 and 2) in the flange 35 of the spool 20. One of the bolts 34 is shown inserted in one of the holes 58 in FIG. 2. The bolts are tightened against the assembly body 15 and the spool 20, the shaft 10 and the second auxiliary sealing device 53 are pulled back in the direction of arrow 59 to put the sealing ring 56 into fluid-tight contact with the annular portion 57, as shown in FIG. 2. To hold the second sealing device 53 in sealing engagement, shut-off locking device 60 is set into groove 61 in the sealing device 53, again as shown in FIG. 2.

Figure 3:
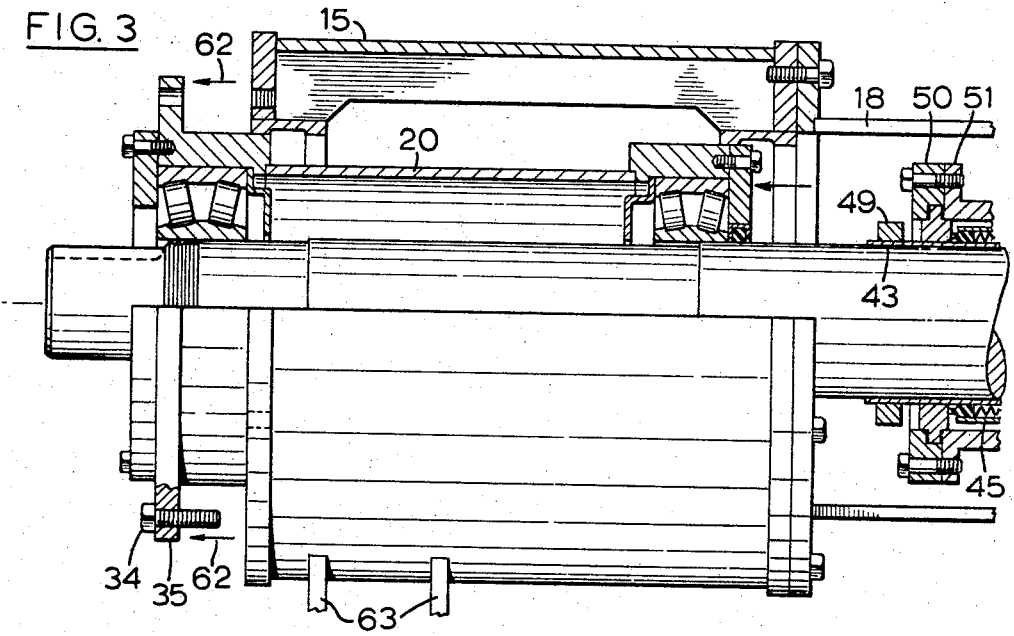
FIG. 3 is a partial elevational view of the assembly shown in FIG. 1 and FIG. 2 depicting removal of the bearing retaining spool, with parts of the arrangement shown in section.

Once the second sealing device 53 has been brought into engagement, the spool 20 and mechanical seal 45 (if desired) may be removed. This is accomplished by removing the sheave 23, if not already removed, the shaft mounting nut 27 and the lockwasher 28. The bolts 34 in the holes 58 are then further tightened to jack back the spool 20 from tight engagement with the shaft 10. The bearing retaining spool 20, complete with the shaft support bearings 21, 22, is then withdrawn from around the shaft and out of the assembly body 15. Referring to FIG. 3, the shaft mounting nut 27 and the lockwasher 28 are seen to be removed and the spool 20 is being withdrawn in the direction of arrows 62. When the spool 20 has been removed, the mechanical seal locking ring 50 can be unbolted from the flange 51 and the mechanical seal assembly can be slid back along the shaft and removed for repair or replacement.

The shaft support and drive assembly aforedescribed can be supported in any position in relation to a fluid container using a mounting bracket, such as bracket 63 shown in FIGS. 1 and 2. Thus, the shaft may be projecting through a side, bottom or top wall of a container and may enter the wall at right angles or at an acute angle thereto. The shaft can be connected to repulping, mixing, agitating, dispersing or pumping devices and although the invention has been described in conjunction with use with containers for fluids and fluid-solid mixtures, utilization of the novel shaft support assembly hereindescribed in conjunction with the mixing or agitation of solids is within the ambit of the invention.

Figure 4:
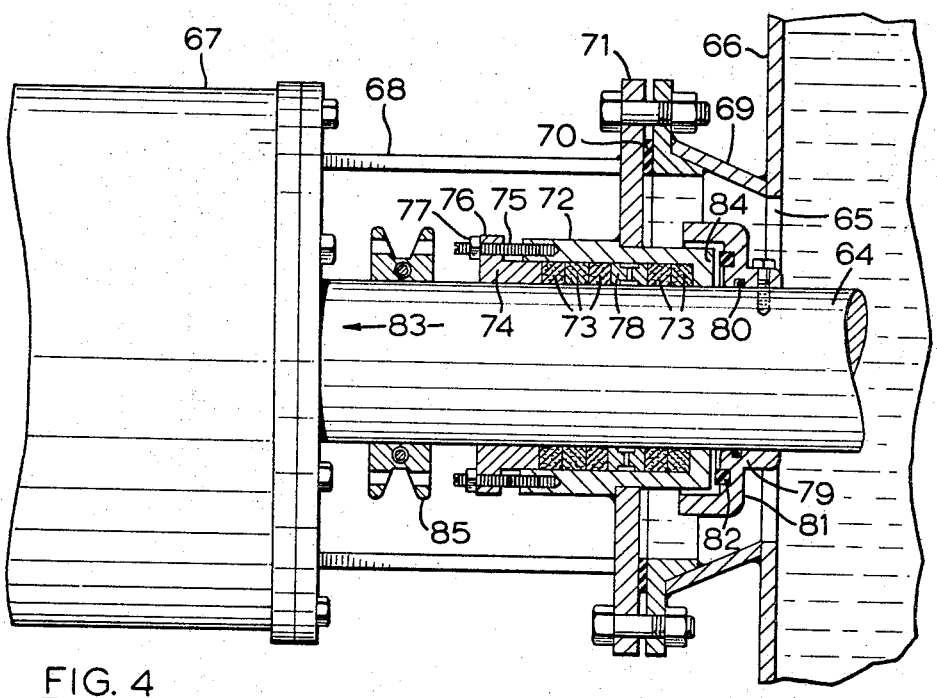
FIG. 4 shows a partial elevational view of another embodiment of the invention utilizing a different type of primary sealing means, with parts of the arrangement broken away and in section.

While a preferred embodiment of the present invention has been described and illustrated, it will be apparent to those skilled in the art that various modifications in the construction and arrangement of parts of the apparatus described are possible without departing from the spirit and scope of the invention. Thus, for example, instead of an unsplit seal assembly, such as the mechanical seal assembly depicted in FIGS. 1, 2 and 3, a packed stuffing box utilizing a split packing gland may be used as the first sealing means and such an arrangement is illustrated in FIG. 4 which shows a shaft 64 projecting through an opening 65 in wall 66 of a container for fluids. Only a portion of assembly body 67 surrounding the shaft 64 is shown with the supporting mechanism for the shaft, similar to that illustrated in FIGS. 1 and 2, not being shown. The assembly body 67 is bolted to flange assembly 68 which is in turn bolted to and supported by adaptor flange 69, surrounding the opening 65 and integrally attached to the wall 66. A fluid-tight connection is provided between the flange assembly 68 and the adaptor flange 69 by means of gasket 70. The flange assembly 68 has an annular plate 71 integrally attached thereto and a cylindrical stuffing box 72 is integrally connected in a fluid-tight manner to the plate 71. The stuffing box 72 extends along the shaft 64 away from the opening 65 and surrounds the shaft in a spaced-apart relationship therewith.

The stuffing box 72 is stuffed with split packing rings 73 which are retained in the stuffing box and held in compression by a split packing gland 74 which is held in position by studs 75 attached to the stuffing box 72 and running through flange 76 on the gland 74. Packing gland nuts 77 are tightened over the studs 75. A lubricant distributing ring 78 is located amongst the packing rings 73 and lubricant is supplied to the ring 78 through a lubrication line (not shown) in the plate 71.

Located outside the stuffing box 72 is a second, auxiliary sealing means 79 which is shown out of sealing engagement in FIG. 4, with the shaft 64 in operating condition. The sealing means 79 encircles the shaft 64 in fluid-tight relationship therewith, with O ring 80 preventing fluid leakage along the shaft. The sealing means 79 has a projecting collar portion 81 thereon with a shut-off annular sealing ring 82 set in the collar portion 81. Upon movement of the shaft 64 back in the direction of the arrow 83, by the procedure described in conjunction with FIGS. 1 and 2, the sealing means 79 is put into sealing engagement when the sealing ring 82 is put into fluid-tight contact against portion 84 of the stuffing box 72. When the second sealing means 79 is in sealing position the packing gland 74 is removed and a slinger or shaft holding device 85 which can be fixed to the shaft 64 is brought into position over the studs 75 and bolted in place to hold the shaft 64 and the sealing means 79 in sealing position. The bearing retaining spool may then be removed for service by the procedure as described in conjunction with FIGS. 2 and 3. The packed stuffing box is serviced by first putting the second sealing means 79 in sealing engagement and then removing the split packing gland 74, after which the split packing rings 73 and the lubricant distributing ring 78 are fished out and the stuffing box 72 is then repacked.

It can be seen that the present invention provides a novel support and seal assembly for a rotatable shaft which has rugged and simple design and allows the rapid removal for servicing and replacement, if necessary, of support bearings for the shaft. At the same time, rapid removal and replacement of unsplit seal assemblies or rapid repacking of packing boxes is possible. All of such servicing is possible without drainage of a container for fluid into which the shaft is projecting. Bearings can be utilized for the assembly which are of a standard type and not specially made for the job. Furthermore, design of the assembly is such as to provide a relatively short distance between seal and support bearings, thereby reducing stress on the seal and ensuring high performance therefrom.

What I claim as my invention is:

1. A shaft seal and support assembly for a unitary rotatable shaft projecting through an opening in a container for fluids and having an end supported outside the container which comprises a rotatable shaft, a first sealing means encircling the shaft preventing leakage of fluid from the container along the shaft during operation of the shaft, a second sealing means encircling the shaft in fluid tight relationship therewith between the first sealing means and the container and out of sealing engagement during operation of the shaft but movable to sealing engagement when the shaft is not in operation to also prevent fluid leakage from the container along the shaft, a drive connecting means connected to the outside end of the shaft drivable by a drive means, an assembly body surrounding the shaft between the drive connecting means and the first sealing means, a shaft bearing retaining spool containing front and rear bearings for the shaft, the spool carrying the front and rear bearings being slidably tightly located inside the assembly body and removably attached to the assembly at the outside end of the shaft and having a tight friction fit around said shaft, a shaft retaining means on the outside end of the shaft and adjustable means for first bringing the second sealing means into sealing engagement and then loosening the spool from the shaft upon removal of the drive connecting means and the shaft retaining means to allow removal of the bearing retaining spool complete with bearings from the assembly body and from the outside end of the unitary shaft while avoiding removal of the assembly body and any drive means associated with the drive connecting means.

2. A shaft seal and support assembly for a unitary rotatable shaft projecting through an opening in a container for fluids and having an end supported outside the container which comprises a rotatable shaft, a first sealing means encircling the shaft preventing leakage of fluid from the container along the shaft during operation of the shaft, a second sealing means encircling the shaft in fluid tight relationship therewith between the first sealing means and the container and out of sealing engagement during operation of the shaft but movable to sealing engagement when the shaft is not in operation to also prevent fluid leakage from the container along the shaft, a drive connecting means closely engaging the outside end of the shaft and drivable by a drive means, an assembly body surrounding the shaft between the drive connecting means and the first sealing means and integrally attachable to the container against the opening therein, a shaft bearing retaining spool slidably and tightly located inside the assembly body containing a front bearing and a rear bearing for the shaft, said front and rear bearings being located near the first sealing means and the outside end of the shaft respectively, the spool carrying the front and rear bearings being attached to the assembly body at the rear bearing end thereof by removable attaching means and having a tight friction fit around said shaft, a shaft retaining means on the outside end of the shaft and adjustable means for first bringing the second sealing means into sealing engagement upon removal of the removable attaching means for the spool and then loosening the spool from the shaft upon removal of the drive connecting means and the shaft retaining means, after engagement of the second sealing means, to allow removal of the bearing retaining spool complete with bearings from the assembly body and from the outside end of the unitary shaft while avoiding removal of the assembly body and any drive means associated with the drive connecting means.

3. A shaft seal and support assembly as claimed in claim 2 wherein the first sealing means is an unsplit seal assembly which is removable from the shaft upon removal of the bearing retaining spool by sliding the seal assembly along the shaft and through the assembly body.

4. A shaft seal and support assembly as claimed in claim 3 wherein a shut-off locking device located out of contact with any fluid in the container is provided in the assembly for locking the shaft and second sealing means in position after the second sealing means has been brought into sealing engagement while avoiding contact with and loss of fluid from the container.

5. A shaft seal and support assembly as claimed in claim 3 wherein the adjustable means for bringing the second sealing means into sealing engagement is at least two bolts screwed into the rear bearing end of the retaining spool and contactable with the assembly body upon continuous tightening of the two bolts to pull the second sealing means into sealing engagement and to loosen the retaining spool from the shaft upon further tightening.

References Cited

UNITED STATES PATENTS

| | | | |
|---|---|---|---|
| 2,137,328 | 11/1938 | Bissell | 308—36.1 |
| 2,584,252 | 2/1952 | Bourgeois | 308—36.1 |
| 2,609,587 | 9/1952 | Kuljian | 308—20 X |
| 2,638,364 | 5/1953 | Rechtin | 277—9 X |
| 2,853,321 | 9/1958 | Davey | 277—9 |
| 2,913,169 | 11/1959 | Wilsmann | 308—36.1 X |
| 3,129,010 | 4/1964 | Stratienko | 277—9 |
| 3,149,888 | 9/1964 | Lennon | 277—9 X |
| 3,202,007 | 8/1965 | Stratienko | 277—9 X |

MARTIN P. SCHWADRON, *Primary Examiner.*

L. L. JOHNSON, *Assistant Examiner.*

U.S. Cl. X.R.

308—36.2, 207; 277—9